United States Patent
Chavan et al.

(10) Patent No.: US 12,491,103 B2
(45) Date of Patent: Dec. 9, 2025

(54) URINARY COLLECTION SYSTEM

(71) Applicant: C. R. Bard, Inc., Franklin Lakes, NJ (US)

(72) Inventors: Varad Chavan, Kolhapur (IN); Jason Jishen Cheng, Avondale Estates, GA (US)

(73) Assignee: C. R. Bard, Inc., Franklin Lakes, NJ (US)

( * ) Notice: Subject to any disclaimer, the term of this patent is extended or adjusted under 35 U.S.C. 154(b) by 0 days.

(21) Appl. No.: 17/863,898

(22) Filed: Jul. 13, 2022

(65) Prior Publication Data
US 2023/0013353 A1 Jan. 19, 2023

Related U.S. Application Data

(60) Provisional application No. 63/221,809, filed on Jul. 14, 2021.

(51) Int. Cl.
*A61F 5/44* (2006.01)
*A61F 5/441* (2006.01)

(52) U.S. Cl.
CPC .......... *A61F 5/4405* (2013.01); *A61F 5/441* (2013.01)

(58) Field of Classification Search
CPC .......... A61F 5/44; A61F 5/441; A61F 5/4405; A61F 5/4407; B65B 69/0016;
(Continued)

(56) References Cited

U.S. PATENT DOCUMENTS 3,114,916 A   12/1963   Hadley
3,583,401 A    6/1971   Vailiancourt et al.
(Continued)

FOREIGN PATENT DOCUMENTS

CN   106955208 A   7/2017
CN   116650740 A   8/2023
(Continued)

OTHER PUBLICATIONS

PCT/US2020/066707 filed Dec. 22, 2020 International Search Report and Written Opinion dated Apr. 15, 2021.
(Continued)

*Primary Examiner* — Adam Marcetich
*Assistant Examiner* — Timothy L Flynn
(74) *Attorney, Agent, or Firm* — Rutan & Tucker LLP (57) ABSTRACT

Disclosed herein is a urinary collection system including a urine collection bag and a vacuum chamber coupled to the urine collection bag. The vacuum chamber is positioned in a vertical orientation. A top end of the vacuum chamber includes a drainage inlet and a vacuum port, and a bottom end of the vacuum chamber includes a drainage outlet. An isolation chamber is disposed between the vacuum chamber and urine collection bag, where the isolation chamber is configured to prevent reflux of urine from the urine collection bag into the vacuum chamber. A vacuum tube extends between the vacuum chamber and a vacuum pump. A plunger valve in line with an outlet of vacuum chamber is transitioned to a closed state when a vacuum is applied to the vacuum chamber and transitioned back the open state when the vacuum is removed from the vacuum chamber.

20 Claims, 9 Drawing Sheets

(58) Field of Classification Search
CPC .. A61M 2039/2413; A61M 2039/2453; A61M 2039/2473; A61M 5/68; A61M 5/1411; A61M 1/3627; A61M 2039/224; A61M 2039/268; A61M 2039/2486; A61M 2039/2433; A61M 39/24; F16K 15/00; F16K 15/02; F16K 15/14; F16K 15/141; F16K 15/144; F16K 15/148

See application file for complete search history.

(56) References Cited

U.S. PATENT DOCUMENTS

| | | | |
|---|---|---|---|
| 3,598,124 | A | 8/1971 | Andersen et al. |
| 3,661,143 | A | 5/1972 | Henkin |
| 3,707,972 | A | 1/1973 | Villari et al. |
| 3,861,394 | A | 1/1975 | Villari |
| 3,901,235 | A * | 8/1975 | Patel ........... A61F 5/4405 604/350 |
| 3,955,574 | A | 5/1976 | Rubinstein |
| 4,084,593 | A | 4/1978 | Jarund |
| 4,265,243 | A | 5/1981 | Taylor |
| 4,305,403 | A | 12/1981 | Dunn |
| 4,315,506 | A | 2/1982 | Kayser et al. |
| 4,360,933 | A | 11/1982 | Kimura et al. |
| 4,465,485 | A | 8/1984 | Kashmer et al. |
| 4,490,144 | A * | 12/1984 | Steigerwald ..... A61F 5/4405 604/350 |
| 4,531,939 | A | 7/1985 | Izumi |
| 4,556,997 | A | 12/1985 | Takamiya et al. |
| 4,631,061 | A | 12/1986 | Martin |
| 4,654,029 | A | 3/1987 | D'Antonio |
| 4,747,166 | A | 5/1988 | Kuntz |
| 4,810,242 | A | 3/1989 | Sundblom et al. |
| 4,819,684 | A | 4/1989 | Zaugg et al. |
| 4,872,579 | A | 10/1989 | Palmer |
| 4,880,411 | A | 11/1989 | Fangrow, Jr. et al. |
| 4,990,137 | A | 2/1991 | Graham |
| 5,002,528 | A | 3/1991 | Palestrant |
| 5,071,411 | A | 12/1991 | Hillstead |
| 5,186,431 | A | 2/1993 | Tamari |
| 5,242,404 | A | 9/1993 | Conley et al. |
| 5,318,550 | A | 6/1994 | Cermak et al. |
| 5,359,233 | A | 10/1994 | Mumper et al. |
| 5,405,319 | A | 4/1995 | Abell et al. |
| RE35,707 | E | 12/1997 | Takamiya et al. |
| 5,738,656 | A | 4/1998 | Wagner et al. |
| 5,813,842 | A | 9/1998 | Tamari |
| 5,894,608 | A | 4/1999 | Birbara |
| 6,007,521 | A | 12/1999 | Bidwell et al. |
| 6,106,506 | A | 8/2000 | Abell et al. |
| 6,183,454 | B1 | 2/2001 | Levine et al. |
| 8,266,741 | B2 | 9/2012 | Penninger et al. |
| 8,337,475 | B2 | 12/2012 | Christensen et al. |
| 8,366,692 | B2 | 2/2013 | Weston et al. |
| 8,475,419 | B2 | 7/2013 | Eckermann |
| 8,512,301 | B2 | 8/2013 | Ma |
| 9,814,866 | B1 | 11/2017 | Goswami |
| 10,391,275 | B2 | 8/2019 | Burnett et al. |
| 10,426,919 | B2 | 10/2019 | Erbey, II et al. |
| 10,506,965 | B2 | 12/2019 | Cooper et al. |
| 10,737,057 | B1 | 8/2020 | Mikhail et al. |
| 10,772,998 | B2 | 9/2020 | Luxon et al. |
| 2002/0000253 | A1 | 1/2002 | Fillmore et al. |
| 2002/0161317 | A1 | 10/2002 | Risk et al. |
| 2003/0078638 | A1 | 4/2003 | Voorhees et al. |
| 2004/0176746 | A1 | 9/2004 | Forral |
| 2004/0230181 | A1 | 11/2004 | Cawood |
| 2004/0236292 | A1 | 11/2004 | Tazoe et al. |
| 2004/0254547 | A1 | 12/2004 | Okabe et al. |
| 2005/0197647 | A1 | 9/2005 | Dolliver et al. |
| 2005/0209585 | A1 | 9/2005 | Nord et al. |
| 2005/0245898 | A1 | 11/2005 | Wright et al. |
| 2005/0256460 | A1 | 11/2005 | Rome et al. |
| 2005/0261619 | A1 | 11/2005 | Gay |
| 2006/0015190 | A1 | 1/2006 | Robertson |
| 2006/0079854 | A1 * | 4/2006 | Kay ............... A61F 5/4405 604/328 |
| 2006/0155260 | A1 | 7/2006 | Blott et al. |
| 2006/0235353 | A1 | 10/2006 | Gelfand et al. |
| 2006/0270971 | A1 | 11/2006 | Gelfand et al. |
| 2006/0271019 | A1 | 11/2006 | Stoller et al. |
| 2007/0005002 | A1 | 1/2007 | Millman et al. |
| 2007/0078444 | A1 | 4/2007 | Larsson |
| 2007/0142729 | A1 | 6/2007 | Pfeiffer et al. |
| 2007/0272311 | A1 | 11/2007 | Trocki et al. |
| 2008/0051708 | A1 | 2/2008 | Kumar et al. |
| 2008/0156092 | A1 | 7/2008 | Boiarski |
| 2008/0281254 | A1 | 11/2008 | Humayun et al. |
| 2009/0157016 | A1 | 6/2009 | Adahan |
| 2009/0157040 | A1 | 6/2009 | Jacobson et al. |
| 2009/0326483 | A1 | 12/2009 | Green |
| 2010/0106116 | A1 | 4/2010 | Simmons et al. |
| 2010/0130949 | A1 | 5/2010 | Garcia |
| 2010/0280435 | A1 | 11/2010 | Raney et al. |
| 2011/0060300 | A1 | 3/2011 | Weig et al. |
| 2012/0036638 | A1 | 2/2012 | Penninger et al. |
| 2012/0323144 | A1 | 12/2012 | Coston et al. |
| 2013/0218106 | A1 | 8/2013 | Coston et al. |
| 2014/0053841 | A1 | 2/2014 | Ratner |
| 2014/0200558 | A1 | 7/2014 | McDaniel |
| 2014/0200588 | A1 | 7/2014 | Anderson et al. |
| 2015/0126975 | A1 | 5/2015 | Wuthier |
| 2015/0290448 | A1 | 10/2015 | Pavlik |
| 2016/0135982 | A1 | 5/2016 | Garcia |
| 2016/0183819 | A1 | 6/2016 | Burnett et al. |
| 2016/0310711 | A1 | 10/2016 | Luxon et al. |
| 2017/0014617 | A1 | 1/2017 | Huici |
| 2017/0072125 | A1 | 3/2017 | Wallenås et al. |
| 2017/0136209 | A1 | 5/2017 | Burnett et al. |
| 2017/0143566 | A1 | 5/2017 | Elku et al. |
| 2017/0241978 | A1 | 8/2017 | Duval |
| 2017/0312114 | A1 * | 11/2017 | Glithero ........ A61B 5/150366 |
| 2018/0015251 | A1 | 1/2018 | Lampotang et al. |
| 2018/0071441 | A1 | 3/2018 | Croteau et al. |
| 2018/0104391 | A1 | 4/2018 | Luxon et al. |
| 2018/0110456 | A1 | 4/2018 | Cooper et al. |
| 2018/0125697 | A1 | 5/2018 | Ferrera |
| 2018/0177458 | A1 | 6/2018 | Burnett et al. |
| 2018/0235523 | A1 | 8/2018 | Sauder |
| 2018/0245699 | A1 | 8/2018 | Lee |
| 2018/0360424 | A1 | 12/2018 | Yurek et al. |
| 2019/0009021 | A1 | 1/2019 | Nelson et al. |
| 2019/0009023 | A1 | 1/2019 | Diperna et al. |
| 2019/0030264 | A1 | 1/2019 | Herskovic et al. |
| 2019/0038451 | A1 | 2/2019 | Harvie |
| 2019/0046102 | A1 | 2/2019 | Kushnir et al. |
| 2019/0126006 | A1 | 5/2019 | Rehm et al. |
| 2019/0143008 | A1 | 5/2019 | Brundage et al. |
| 2019/0143094 | A1 | 5/2019 | DeMeritt |
| 2019/0151610 | A1 | 5/2019 | Fletter |
| 2019/0343445 | A1 | 11/2019 | Burnett et al. |
| 2020/0000979 | A1 | 1/2020 | Myers |
| 2020/0061281 | A1 | 2/2020 | Desouza et al. |
| 2020/0315837 | A1 * | 10/2020 | Radl ............... A61M 1/74 |
| 2021/0077007 | A1 | 3/2021 | Jouret et al. |
| 2022/0152345 | A1 | 5/2022 | Simiele et al. |
| 2022/0160949 | A1 | 5/2022 | Simiele et al. |
| 2022/0176031 | A1 | 6/2022 | Cheng et al. |
| 2022/0193366 | A1 | 6/2022 | Cheng et al. |
| 2022/0218890 | A1 | 7/2022 | Chavan |
| 2022/0218973 | A1 | 7/2022 | Chavan et al. |
| 2022/0218974 | A1 | 7/2022 | Chavan et al. |
| 2022/0273213 | A1 | 9/2022 | Sokolov et al. |
| 2022/0287689 | A1 | 9/2022 | Johannes |
| 2022/0305189 | A1 | 9/2022 | Chavan et al. |
| 2022/0330867 | A1 * | 10/2022 | Conley ........... A61M 5/1723 |
| 2022/0362080 | A1 | 11/2022 | McCorquodale et al. |
| 2022/0409421 | A1 * | 12/2022 | Hughett ........ A61F 5/4408 |
| 2023/0030637 | A1 | 2/2023 | Gloeckner et al. |
| 2023/0054937 | A1 | 2/2023 | Chancy et al. |
| 2023/0083906 | A1 | 3/2023 | Jones et al. |
| 2023/0277199 | A1 | 9/2023 | Duffy |
| 2023/0310837 | A1 | 10/2023 | Gamsizlar et al. |
| 2024/0033404 | A1 * | 2/2024 | Ishikawa ........ A61M 1/062 |

(56) References Cited

U.S. PATENT DOCUMENTS

| | | |
|---|---|---|
| 2024/0238500 A1 | 7/2024 | Simiele et al. |
| 2024/0307604 A1 | 9/2024 | Chavan |
| 2025/0009578 A1 | 1/2025 | Chancy et al. |
| 2025/0018147 A1 | 1/2025 | Rehm |
| 2025/0018149 A1 | 1/2025 | Cheng et al. |
| 2025/0025617 A1 | 1/2025 | Chavan et al. |
| 2025/0025620 A1 | 1/2025 | Cheng et al. |
| 2025/0040848 A1 | 2/2025 | Lai et al. |
| 2025/0177632 A1 | 6/2025 | Jones et al. |
| 2025/0186735 A1 | 6/2025 | Rehm et al. |
| 2025/0288775 A1 | 9/2025 | Simiele et al. |

FOREIGN PATENT DOCUMENTS

| | | |
|---|---|---|
| EP | 1872752 A1 | 1/2008 |
| EP | 2417955 A2 | 2/2012 |
| EP | 2730299 A1 | 5/2014 |
| WO | 2009026237 A1 | 2/2009 |
| WO | 2012016179 A1 | 2/2012 |
| WO | 2015019056 A1 | 2/2015 |
| WO | 2015105916 A1 | 7/2015 |
| WO | 2016012494 A1 | 1/2016 |
| WO | 2017177068 A1 | 10/2017 |
| WO | 2018136306 A1 | 7/2018 |
| WO | 2018191193 A1 | 10/2018 |
| WO | 2019004854 A1 | 1/2019 |
| WO | 2020033752 A1 | 2/2020 |
| WO | 2021154427 A1 | 8/2021 |
| WO | 2022/159333 A1 | 7/2022 |
| WO | 2022251425 A1 | 12/2022 |
| WO | 2023086394 A1 | 5/2023 |

OTHER PUBLICATIONS

U.S. Appl. No. 17/526,994, filed Nov. 15, 2021 Restriction Requirement dated Jan. 3, 2023.
U.S. Appl. No. 17/556,942, filed Dec. 20, 2021 Non-Final Office Action dated Jan. 31, 2023.
PCT/US2022/049418 filed Nov. 9, 2022 International Search Report and Written Opinion dated Feb. 10, 2023.
U.S. Appl. No. 17/526,994, filed Nov. 15, 2021 Non-Final Office Action dated May 10, 2023.
U.S. Appl. No. 17/532,454, filed Nov. 22, 2021 Non-Final Office Action dated Mar. 22, 2023.
U.S. Appl. No. 17/561,504, filed Dec. 23, 2021 Non-Final Office Action dated Mar. 14, 2023.
U.S. Appl. No. 17/902,705, filed Sep. 2, 2022 Non-Final Office Action dated May 24, 2023.
PCT/US2022/012373 filed Jan. 13, 2022 International Search Report and Written Opinion dated Apr. 19, 2022.
U.S. Appl. No. 17/542,060, filed Dec. 3, 2021 Non-Final Office Action dated Jun. 27, 2023.
U.S. Appl. No. 17/556,942, filed Dec. 20, 2021 Advisory Action dated Sep. 1, 2023.
U.S. Appl. No. 17/556,942, filed Dec. 20, 2021 Final Office Action dated Jul. 12, 2023.
U.S. Appl. No. 17/561,458, filed Dec. 23, 2021 Non-Final Office Action dated Jun. 16, 2023.
U.S. Appl. No. 17/561,504, filed Dec. 23, 2021 Final Office Action dated Jul. 19, 2023.
U.S. Appl. No. 17/902,705, filed Sep. 2, 2022 Final Office Action dated Aug. 17, 2023.
U.S. Appl. No. 17/373,568, filed Jul. 12, 2021 Non-Final Office Action dated Nov. 9, 2023.
U.S. Appl. No. 17/526,994, filed Nov. 15, 2021 Final Office Action dated Oct. 24, 2023.
U.S. Appl. No. 17/532,454, filed Nov. 22, 2021 Final Office Action dated Sep. 27, 2023.
U.S. Appl. No. 17/542,060, filed Dec. 3, 2021 Non-Final Office Action dated Nov. 28, 2023.
U.S. Appl. No. 17/556,942, filed Dec. 20, 2021 Non-Final Office Action dated Nov. 3, 2023.
U.S. Appl. No. 17/561,458, filed Dec. 23, 2021 Final Office Action dated Sep. 12, 2023.
U.S. Appl. No. 17/561,504, filed Dec. 23, 2021 Non-Final Office Action dated Nov. 27, 2023.
U.S. Appl. No. 17/902,705, filed Sep. 2, 2022 Advisory Action dated Oct. 19, 2023.
U.S. Appl. No. 17/526,994, filed Nov. 15, 2021 Advisory Action dated Jan. 19, 2024.
U.S. Appl. No. 17/532,454, filed Nov. 22, 2021 Notice of Allowance dated Dec. 8, 2023.
U.S. Appl. No. 17/561,458, filed Dec. 23, 2021 Notice of Allowance dated Dec. 6, 2023.
U.S. Appl. No. 17/561,504, filed Dec. 23, 2021 Notice of Allowance dated Jan. 22, 2024.
U.S. Appl. No. 17/902,705, filed Sep. 2, 2022 Non-Final Office Action dated Dec. 7, 2023.
U.S. Appl. No. 17/373,568, filed Jul. 12, 2021 Notice of Allowance dated Apr. 26, 2024.
U.S. Appl. No. 17/526,994, filed Nov. 15, 2021 Non-Final Office Action dated Apr. 22, 2024.
U.S. Appl. No. 17/556,942, filed Dec. 20, 2021 Final Office Action dated Apr. 4, 2024.
U.S. Appl. No. 17/796,604, filed Jul. 29, 2022 Notice of Allowance dated May 1, 2024.
U.S. Appl. No. 17/902,705, filed Sep. 2, 2022 Final Office Action dated May 22, 2024.
U.S. Appl. No. 17/526,994, filed Nov. 15, 2021 Final Office Action dated Nov. 19, 2024.
U.S. Appl. No. 17/526,994, filed Nov. 15, 2021 Notice of Allowance dated Feb. 5, 2025.
U.S. Appl. No. 17/542,060, filed Dec. 3, 2021 Notice of Allowance dated Jun. 3, 2024.
U.S. Appl. No. 17/556,942, filed Dec. 20, 2021 Notice of Allowance dated Jun. 26, 2024.
U.S. Appl. No. 17/571,254, filed Jan. 7, 2022 Non-Final Office Action dated Feb. 13, 2025.
U.S. Appl. No. 17/571,254, filed Jan. 7, 2022 Restriction Requirement dated Oct. 4, 2024.
U.S. Appl. No. 17/902,705, filed Sep. 2, 2022 Advisory Action dated Aug. 1, 2024.
U.S. Appl. No. 17/902,705, filed Sep. 2, 2022 Notice of Allowance dated Sep. 18, 2024.
U.S. Appl. No. 18/274,157, filed Jul. 25, 2023 Non-Final Office Action dated Jan. 17, 2025.
U.S. Appl. No. 18/674,694, filed May 24, 2024 Non-Final Office Action dated Mar. 3, 2025.
U.S. Appl. No. 17/701,395, filed Mar. 22, 2022 Non-Final Office Action dated Jun. 3, 2025.
U.S. Appl. No. 18/274,157, filed Jul. 25, 2023 Final Office Action dated May 5, 2025.
PCT/US2023/012095 filed Feb. 1, 2023 International Preliminary Report on Patentability dated Jul. 31, 2025.
U.S. Appl. No. 17/571,254 filed Jan. 7, 2022 Final Office Action dated Aug. 13, 2025.
U.S. Appl. No. 18/274,157 filed Jul. 25, 2023 Advisory Action dated Jul. 16, 2025.
U.S. Appl. No. 18/674,694 filed May 24, 2024 Notice of Allowance dated Jun. 23, 2025.

* cited by examiner

URINARY COLLECTION SYSTEM

PRIORITY

This application claims the benefit of priority to U.S. Provisional Application No. 63/221,809, filed Jul. 14, 2021, which is incorporated by reference in its entirety into this application.

BACKGROUND

Most urine collection systems use gravity flow to facilitate transport of urine from the patient to the urine collection bag. However due to normal patient movement, loops in the tubing can occur, leading to a column of urine retained within the tubing. This can cause inaccurate urine output measurements, hydrostatic pressure on the bladder of the patient, or urine backflow into the bladder of the patient. It would be beneficial to the patient and the clinician to have a urine collection system that clears the entirety of the volume of urine collected from the patient from the tubing. Disclosed herein is a system and method of use that address the foregoing.

SUMMARY

Disclosed herein is a urinary collection system that, according to some embodiments includes a urine collection bag and a vacuum chamber coupled with the urine collection bag. The vacuum chamber includes (i) an exit port located at a bottom of the vacuum chamber, the exit port defining a flow path for urine to flow from the vacuum chamber to the urine collection bag; (ii) an inlet port located at a top of the vacuum chamber, the inlet port coupled with a drainage tube of the system, the drainage tube configured to couple with a urinary catheter to define a flow path for urine to flow from a patient bladder to the vacuum chamber; (iii) a vacuum port located at the top of the vacuum chamber, the vacuum port coupled with a vacuum tube of the system, the vacuum tube configured to couple with a vacuum source; and (iv) a plunger valve disposed in line with the exit port, the plunger valve transitionable between an opened state and a closed state. When the plunger valve is transitioned to the opened state, urine is allowed to flow from the vacuum chamber to the urine collection bag, and when plunger valve is transitioned to the closed state, fluid is prevented from flowing from the urine collection bag into vacuum chamber.

In some embodiments, the system further includes the urinary catheter coupled with the drainage tube, and in some embodiments, the system further includes the vacuum source in the form of a vacuum pump, the vacuum pump transitionable between an activated state and a deactivated state.

In some embodiments, the system further includes an isolation chamber coupled between the outlet port and the urine collection bag, where isolation chamber is configured to inhibit reflux of the urine collected within the urine collection bag into the vacuum chamber.

In some embodiments, the isolation chamber includes an inclined bottom surface to inhibit the reflux, and in some embodiments, the urine collection bag includes an opening defining a flow path for urine to flow from the isolation chamber into the urine collection bag, where the opening includes a top perimeter that is disposed below an inlet port of the isolation chamber to further inhibit the reflux.

In some embodiments, the inlet port of the vacuum chamber includes an inlet port check valve in line with the inlet port of the vacuum chamber, the inlet port check valve configured to allow fluid to flow through the inlet port check valve into the vacuum chamber and prevent fluid from flowing out of the vacuum chamber through the inlet port check valve.

In some embodiments, the vacuum port includes vacuum port valve in line with the vacuum port, where the vacuum port valve is configured to (i) allow air to exit the vacuum chamber through the vacuum port valve and (ii) prevent urine from flowing out of the vacuum chamber through the vacuum port valve.

In some embodiments, the vacuum port valve is further configured to prevent air from flowing into the vacuum chamber through the vacuum port valve.

In some embodiments, the plunger valve is configured to (i) transition from the opened state to the closed state when a vacuum is applied to the vacuum chamber and (ii) transition from the closed state to the opened state when the vacuum is removed from the vacuum chamber.

In some embodiments, the plunger valve includes a plunger positionable between a lowered position when the plunger valve is disposed in the opened state and a raised position when the plunger valve is disposed in the closed state. In some embodiments, the plunger is composed of flexible PVC, natural latex rubber, EPDM, or silicone rubber. In some embodiments, the plunger defines a spherical shape. In some embodiments, the plunger includes a plurality of snap fit members configured to engage the exit port to limit vertical displacement of the plunger.

Also disclosed herein is a method that, according to some embodiments, includes (i) coupling a urine collection system to a urinary catheter to define a flow path for urine to flow from the urinary catheter to a urine collection bag of the urine collection system; (ii) establishing a flow of urine from a patient's bladder along a drainage tube of the urine collection system to the urine collection bag, the urine collection system disposed in a urine flowing state; (iii) transitioning the urine collection system from the urine flowing state to a urine purging state to purge urine stagnantly disposed within the drainage tube toward the urine collection bag; and (iv) transitioning the urine collection system back to the urine flowing state from the urine purging state to reestablish the flow of urine from a patient's bladder along a drainage tube to the urine collection bag.

In some embodiments of the method, transitioning the urine collection system from the urine flowing state to a urine purging state includes applying a vacuum to a vacuum chamber of the urine collection system, where the vacuum chamber is disposed in line with the drainage tube between the drainage tube and the urine collection bag, where the vacuum exerts a force on the urine stagnantly disposed within the drainage tube to move the urine stagnantly disposed within the drainage tube toward the vacuum chamber.

In some embodiments of the method, applying the vacuum to the vacuum chamber causes a plunger valve disposed between the vacuum chamber and the urine collection bag to transition to a closed state to prevent fluid from flowing between the urine collection bag and the vacuum chamber.

In some embodiments of the method, transitioning the urine collection system from the urine purging state to the urine flowing state includes removing the vacuum from the vacuum chamber, where removing the vacuum from the vacuum chamber allows the plunger valve to self-transition from the closed state to the opened state.

In some embodiments of the method, applying the vacuum includes applying the vacuum to the vacuum chamber via a vacuum port of the vacuum chamber, where the vacuum port includes a filter disposed across the vacuum port, and where the filter defining a sterile barrier.

In some embodiments of the method, applying a vacuum includes (i) activating a vacuum pump coupled with the vacuum chamber via the vacuum port according to a defined frequency, and (ii) maintaining operation of the vacuum pump for a defined duration for each activation.

These and other features of the concepts provided herein will become more apparent to those of skill in the art in view of the accompanying drawings and following description, which describe particular embodiments of such concepts in greater detail.

DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art. As used herein, the term "fluid" may include a gas, such as air, for example, or a liquid, such as urine, for example.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Figure 1A:
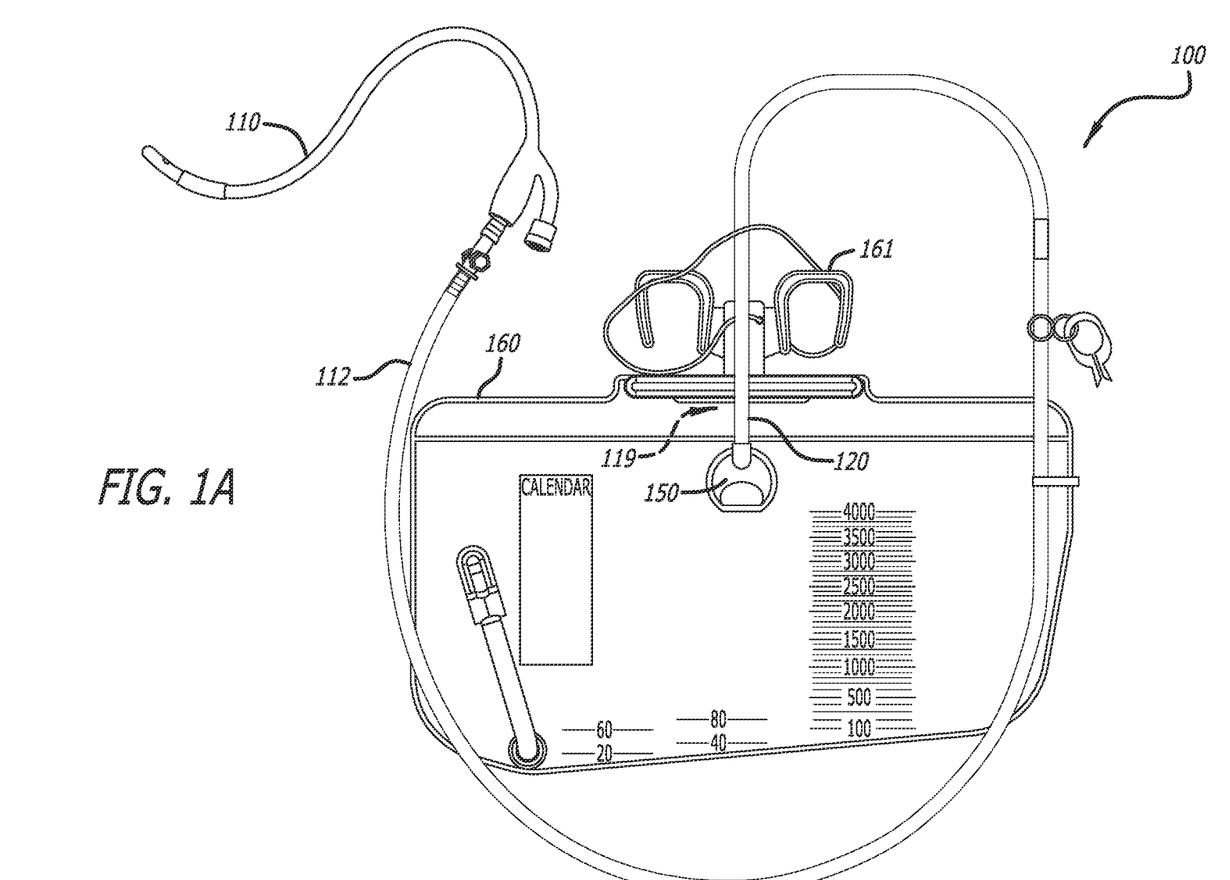
FIG. 1A illustrates a perspective view of a urinary collection system, in accordance with some embodiments.

FIG. 1A illustrates a perspective view of the urinary collection system 100, in accordance with some embodiments. In some embodiments, the urinary collection system ("system") 100 includes a urinary catheter 110 in fluid communication with a vacuum assembly 119. The vacuum assembly 119 may include a vacuum chamber 120. The urinary catheter 110 may be coupled to the vacuum chamber 120 by a drainage tube 112. The vacuum chamber 120 may be fluidly coupled to a urine collection bag 160. In some embodiments, the urine collection bag 160 may include a urine collection bag hanger 161. In some embodiments, the vacuum chamber 120 may be detachably coupled to or tethered to the urine collection bag hanger 161. The vacuum chamber 120 may be coupled to the urine collection bag 160 and oriented in a way that the vacuum chamber 120 is substantially vertical when the urine collection bag 160 is suspended from a hospital bed, a stand, or the like. The vacuum chamber 120 may be configured to clear the entire drainage tube 112 of any volume of urine and direct the volume of urine into the urine collection bag 160, as will be described in more detail herein. The vacuum chamber 120 may be coupled to an isolation chamber 150 in fluid communication with the urine collection bag 160. The isolation chamber 150 may be configured to receive therein a volume of urine from the vacuum chamber 120 and direct the volume of urine into the urine collection bag 160.

Figure 1B:
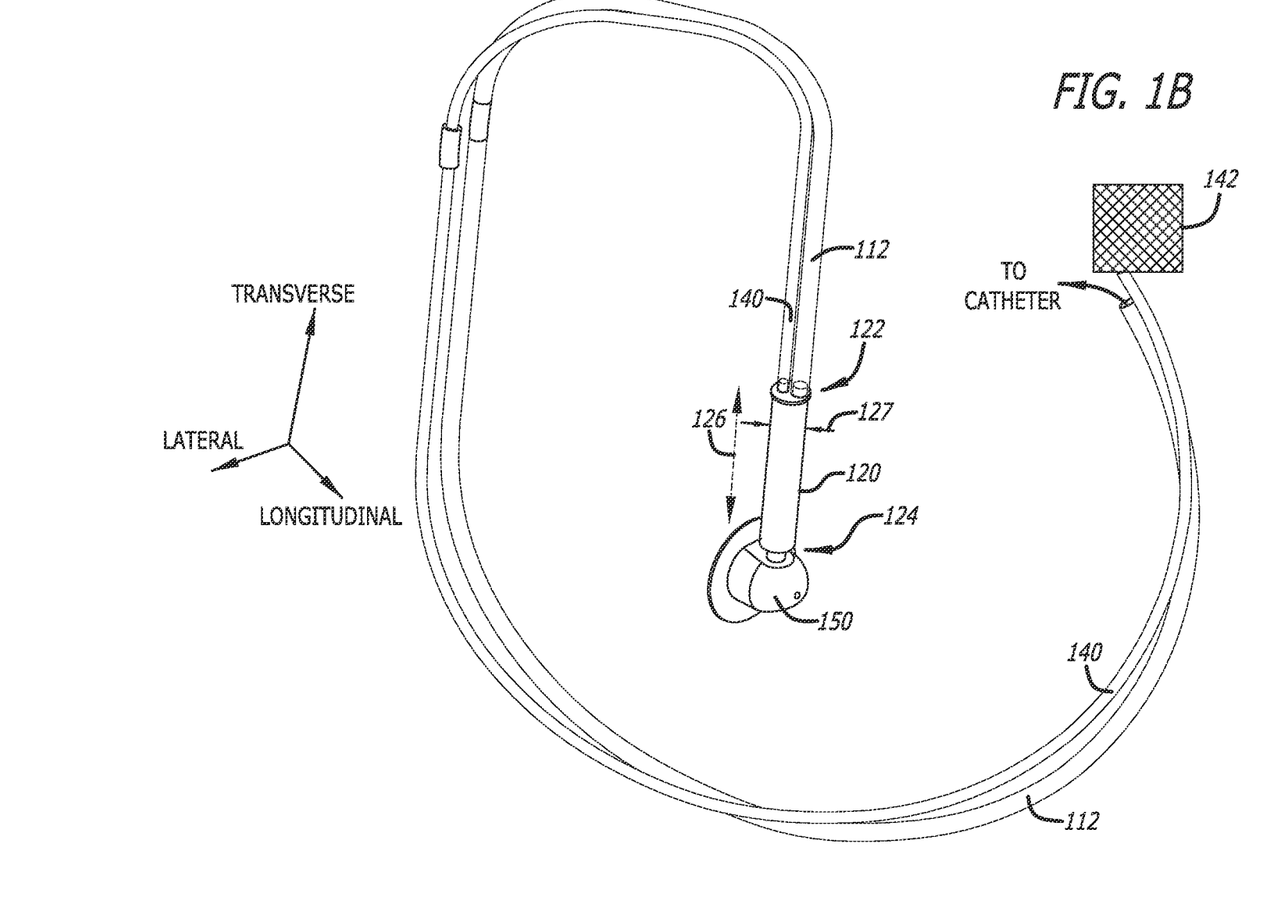
FIG. 1B illustrates a perspective view of the vacuum chamber, in accordance with some embodiments.

FIG. 1B illustrates a perspective view of the vacuum chamber 120, in accordance with some embodiments. In some embodiments, the vacuum chamber 120 may define a top end 122 and a bottom end 124. In some embodiments, the vacuum chamber 120 may be in the shape of cylindrical prism, having a height 126 and a diameter 127. In some embodiments, the height 126 and the diameter 127 may determine the maximum volume of urine the vacuum chamber 120 may receive therein. The top end 122 may be configured to receive thereon the drainage tube 112 and a vacuum tube 140 in fluid communication with a vacuum source/pump 142. In some embodiments, the bottom end 124 may be coupled to the isolation chamber 150. The isolation chamber 150 may be configured to help orient the vacuum chamber 120 vertically along a transverse axis. The isolation chamber 150 may be fixedly coupled with the bag via any suitable plastic coupling process, such as adhesive bonding, solvent boding or welding, for example.

In some embodiments, the isolation chamber 150 may be detachably coupled to the vacuum chamber 120 in a press fit, a snap fit, an interference fit, a twist fit or the like. In some embodiments, the isolation chamber 150 and the vacuum chamber 120 may be formed separately and coupled together before deployment. In some embodiments, the drainage tube 112 and the vacuum tube 140 may be coupled together to help organization of the drainage tube 112 and the vacuum tube 140 during use of the system 100.

Figure 2:
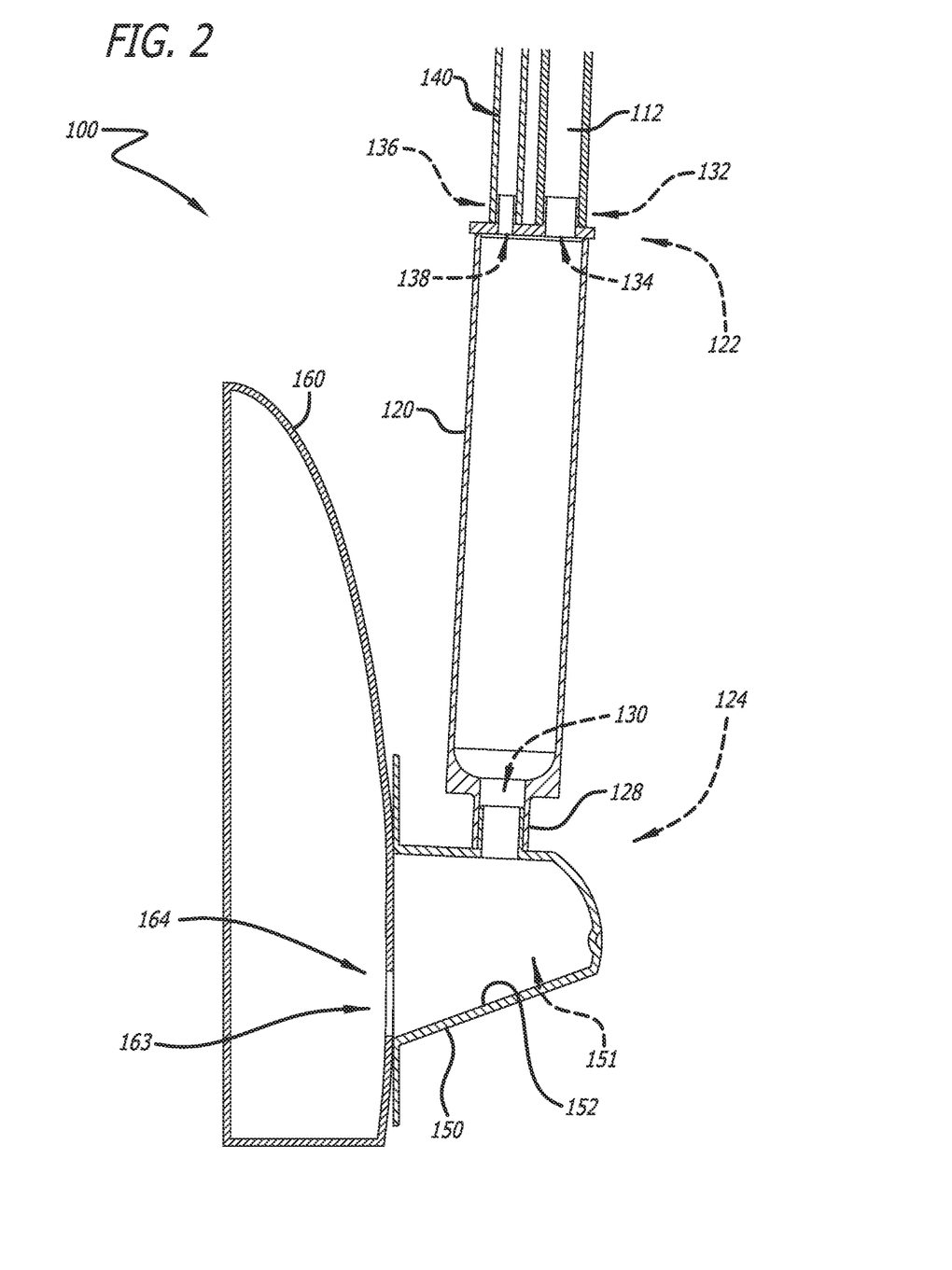
FIG. 2 illustrates a cross sectional view of the vacuum chamber, in accordance with some embodiments.

FIG. 2 illustrates a cross sectional view of the vacuum chamber 120, in accordance with some embodiments. The vacuum chamber 120 includes a drainage outlet 128 (exit port) configured to pass the volume of urine therethrough to the isolation chamber 150. The drainage outlet 128 may be located at the bottom end 124 of the vacuum chamber 120. In some embodiments, the drainage outlet 128 includes a plunger valve 130 configured to transition between an opened configuration and a closed configuration. The closed configuration seals the volume of urine within the vacuum chamber 120 and the opened configuration allows the passage of the volume of urine through the drainage outlet 128 to the isolation chamber 150.

In some embodiments, the top end 122 of the vacuum chamber 120 includes the drainage inlet 132 and the vacuum port 136, each in fluid communication with the vacuum chamber 120. The drainage inlet 132 includes therein an inlet port check valve 134 configured to allow fluid to flow from the drainage tube 112 into the vacuum chamber and prevent fluid from flowing from the vacuum chamber 120 into the drainage tube 112.

The vacuum port 136 may include a vacuum port valve 138 configured to allow air to exit the vacuum chamber through the vacuum port valve 138 and prevent urine from flowing out of the vacuum chamber 120 through the vacuum port valve 138. In some embodiments, the vacuum port valve 138 may include a hydrophobic membrane that is configured to allow air to flow through the membrane while preventing the flow of liquid (e.g., urine) through the membrane. As such, the vacuum port valve 138 may allow the vacuum pump 142 to draw air from the vacuum chamber 120 while preventing the vacuum pump from drawing urine out of the vacuum chamber 120 via the vacuum tube 140. In some embodiments, the vacuum port valve 138 may include a sterilizing filter (e.g., a filter having a pore size less than 0.2 microns) so that the vacuum port valve 138 defines a sterile barrier of the vacuum chamber or the interior of the system 100 as a whole. In some embodiments, the vacuum port valve 138 may be configured to prevent air from exiting the vacuum chamber 120 through the vacuum port valve 138.

The isolation chamber 150 is coupled with the urine collection bag 160 so that urine may flow from the isolation chamber 150 into the urine collection bag 160 through opening 163 extending through a wall of the urine collection bag 160. The opening 163 may be sized and shaped so that a top perimeter 164 of the opening 163 is disposed below the drainage outlet 128 as shown in FIG. 2. The lower position of the top perimeter 164 with respect to the drainage outlet 128 may inhibit reflux of the urine from the isolation chamber 150 to the vacuum chamber 120.

The isolation chamber 150 may be shaped in a hemisphere, defining a dome shaped cavity 151 for receiving urine therein. In some embodiments, the isolation chamber 150 extend perpendicularly from the urine collection bag 160, and the vacuum chamber 120 may be coupled with the isolation chamber 150 so that the vacuum chamber 120 is disposed parallel to the urine collection bag 160, i.e., so that the vacuum chamber 120 is vertically oriented when the urine collection bag 106 is hung. In some embodiments, the dome shaped cavity 151 may include an angled/inclined bottom surface 152 to direct urine flow into the vacuum chamber 120 thereby preventing/inhibiting reflux of the urine back into the vacuum chamber 120. In some embodiments, the vacuum chamber 120 and the isolation chamber 150 may be disposable. In some embodiments, the vacuum chamber 120 and the isolation chamber 150 may be extruded, molded, or 3D printed. In some embodiments, the vacuum chamber 120 and the isolation chamber 150 may be constructed of a thermoplastic material, such as polyethylene, polypropylene, or polyvinyl chloride, for example.

Figure 3A:
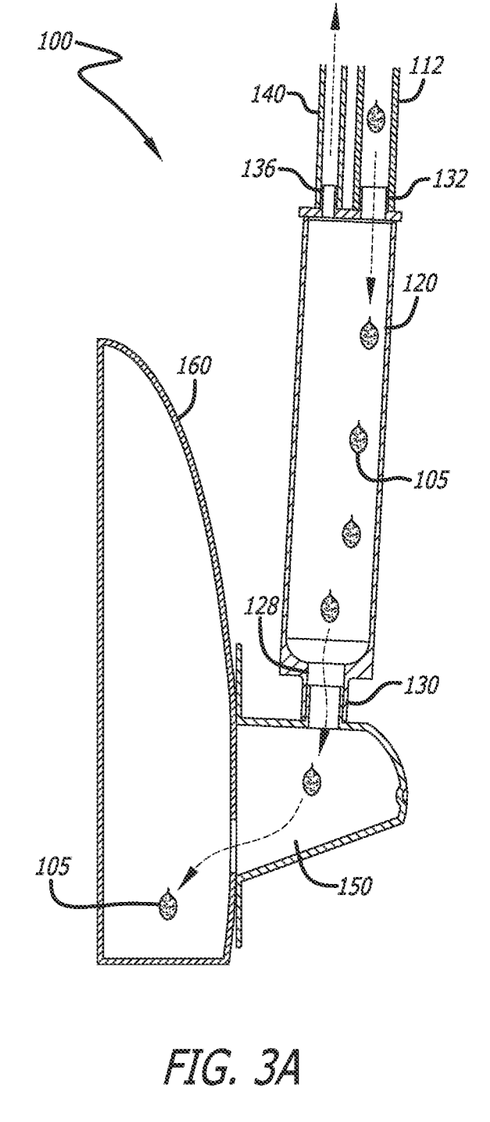
FIGS. 3A-3D illustrate a cross sectional view of an exemplary method of collecting urine in a urine collection bag, in accordance with some embodiments.

FIGS. 3A-3D illustrate cross-sectional side views of the system 100 depicting an exemplary method of collecting urine in the urine collection bag 160 using the urinary collection system 100, in accordance with some embodiments. FIG. 3A illustrates the system 100 disposed in a urine flowing state such that urine 105 flows through the drainage tube 112, through the vacuum chamber 120, through the plunger valve 130 (the plunger valve 130 in an opened state), through the isolation chamber 150 and into the urine collection bag 160. The vacuum chamber 120 includes an ambient pressure environment therein defining the opened state of the plunger valve 130. In some instances, urine 105 may collect and become stagnant along a dependent portion of the drainage tube 112 preventing the flow of urine 105. In such instances, the stagnant urine within the drainage tube 112 must be purged from the drainage tube to allow the urine 105 to flow freely into the urine collection bag 160.

Figure 3B:
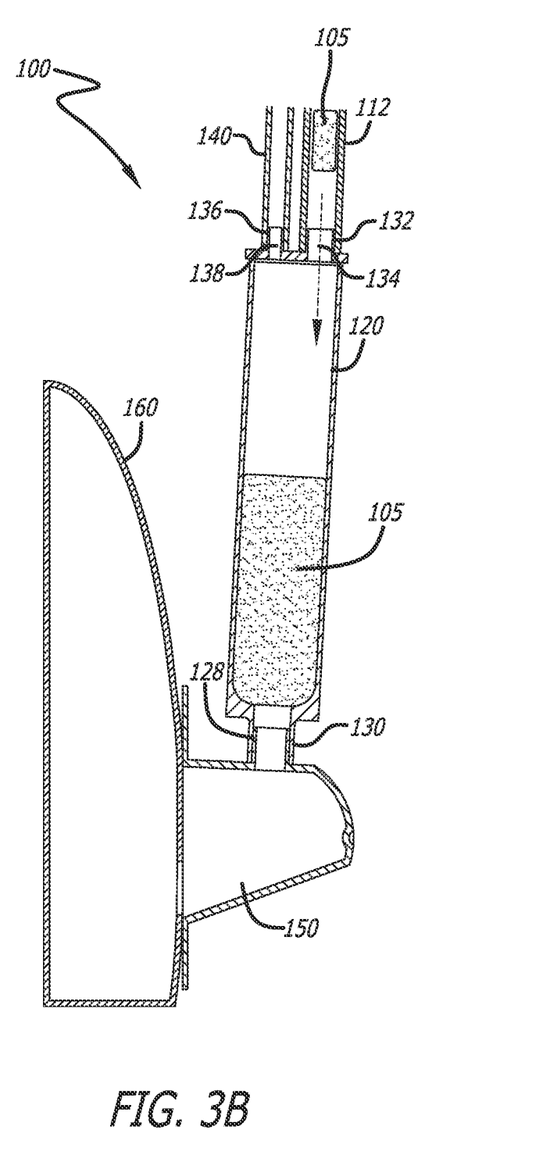

FIG. 3B illustrates the system 100 in a urine purging state, i.e., the system 100 is transitioned from urine flowing state of FIG. 3A into the purging state of FIG. 3B. In FIG. 3B, vacuum is applied to the vacuum chamber causing the plunger valve 130 to transition to the closed state. The vacuum within the vacuum chamber 120 extends into the drainage tube 112 so as to draw the urine 105 along the drainage tube 112 to the vacuum chamber 120 thereby purging the drainage tube 112 of urine 105 as illustrated in FIG. 3B.

Figure 3C:
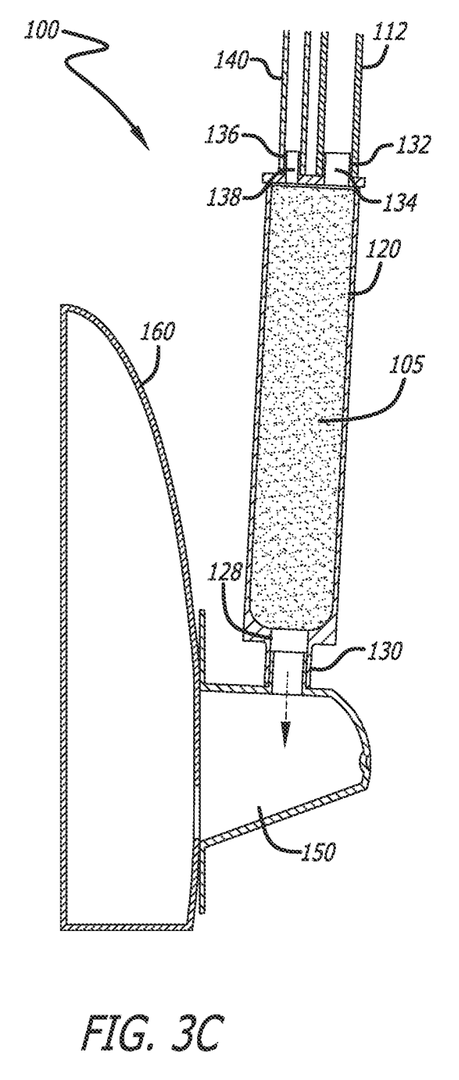

FIG. 3C illustrates an instance where the vacuum chamber 120 is completely filled with urine 105. In such as instance, the vacuum port valve 138 prevents urine 105 from exiting the vacuum port 136 and entering the vacuum tube 140.

Figure 3D:
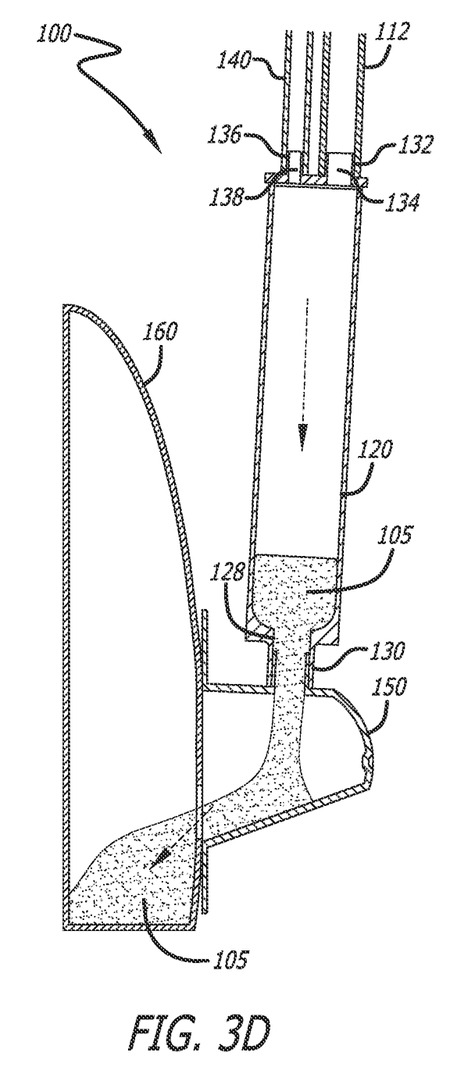

FIG. 3D illustrates the system 100 transitioned back into the urine flowing state of FIG. 3A. The vacuum is removed from the vacuum chamber 120 allowing the plunger valve to self-transition back to the opened state. As such, the urine 105 may drain from the vacuum chamber 120 through the plunger valve 130 and into the urine collection bag 160. With the system 100 transitioned into the urine flowing state and the stagnant urine having been purged from the drainage tube 112, the urine 105 may again flow freely along the drainage tube 112 to the urine collection bag 160.

In some embodiments, a user may activate the vacuum pump 142 to generate the negative pressure environment within the vacuum chamber 120 or the vacuum pump 142 may be activated on a user defined time interval. In some embodiments, when the vacuum chamber 120 has the ambient pressure environment therein, a patient may void a volume of urine that travels to the urine collection bag 160 under gravity flow. In some embodiments, the ambient pressure environment within the vacuum chamber 120 may allow the plunger valve 130 remain in the opened configuration, allowing urine flow from the drainage tube 112 through the vacuum chamber 120 and into the isolation chamber 150. Thereafter, the vacuum pump 142 may then be activated to purge any accumulated urine from the drainage tube 112 into the vacuum chamber 120.

Figure 4A:
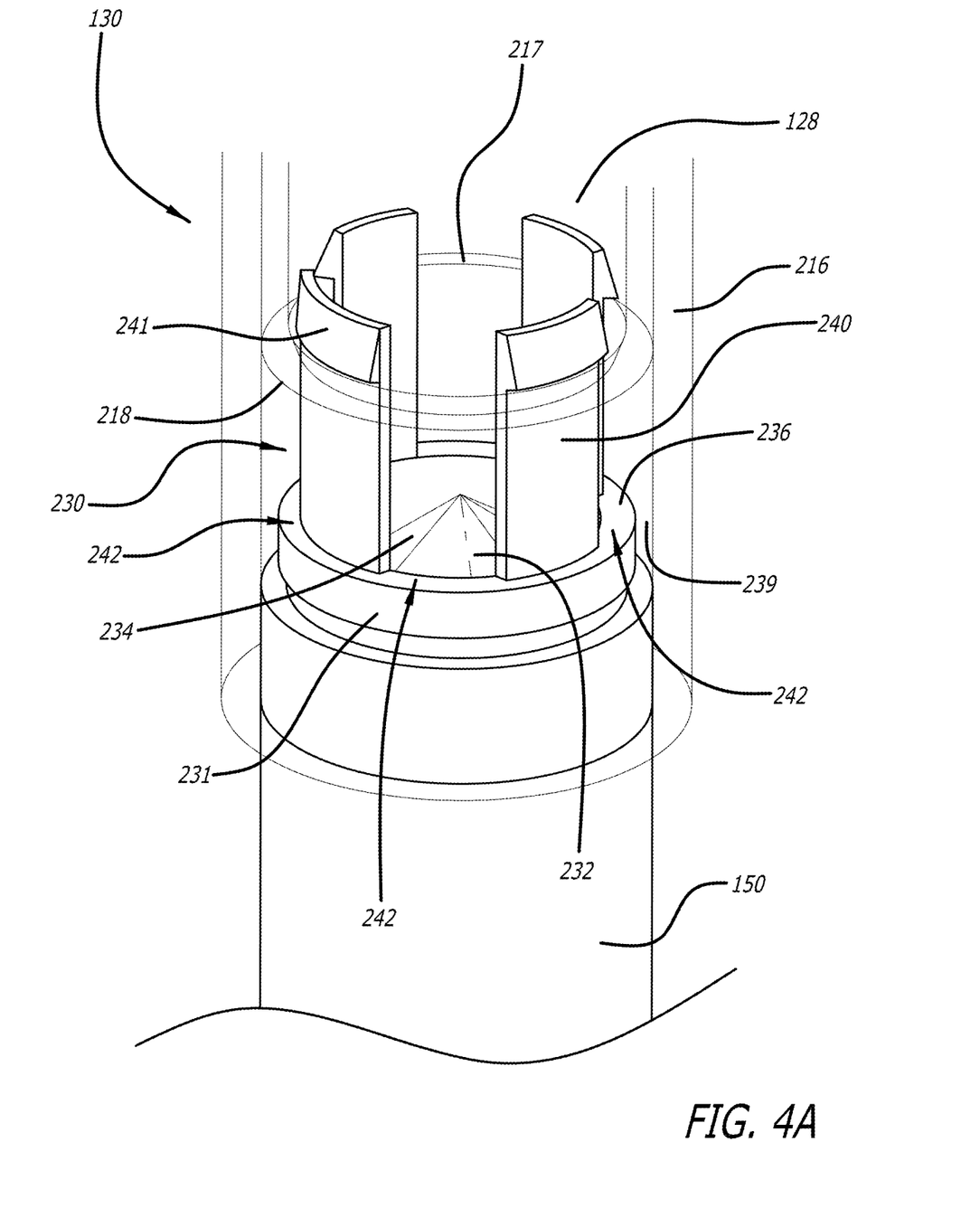
FIGS. 4A-4C illustrate perspective views of one embodiment of the plunger valve, in accordance with some embodiments.
Figure 4B:
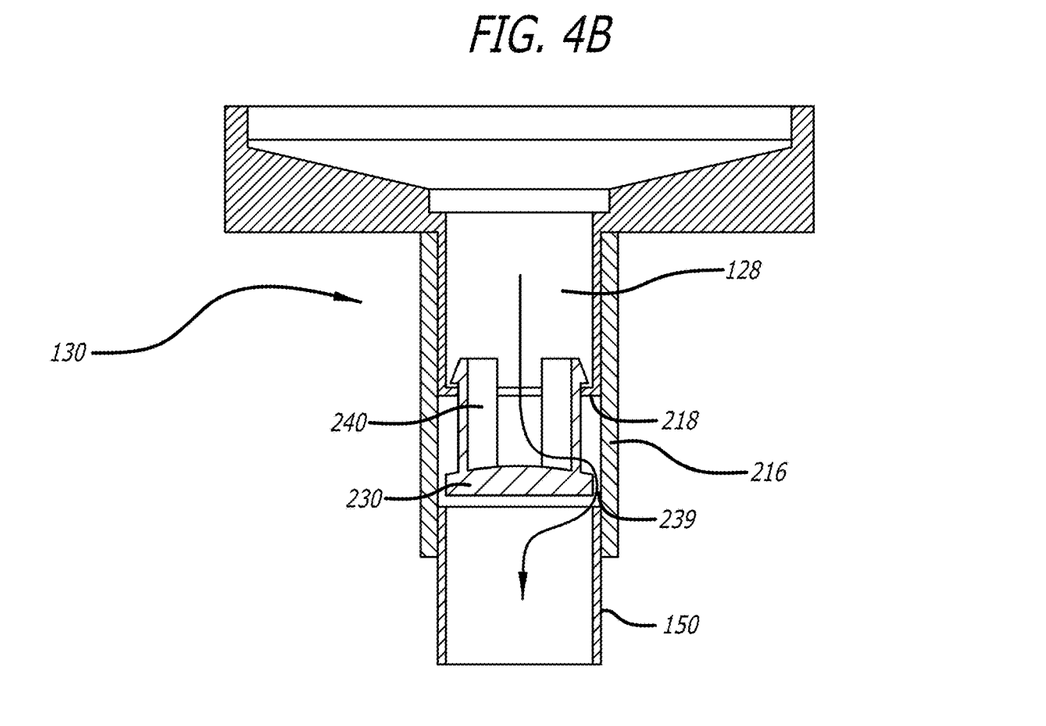
Figure 4C:
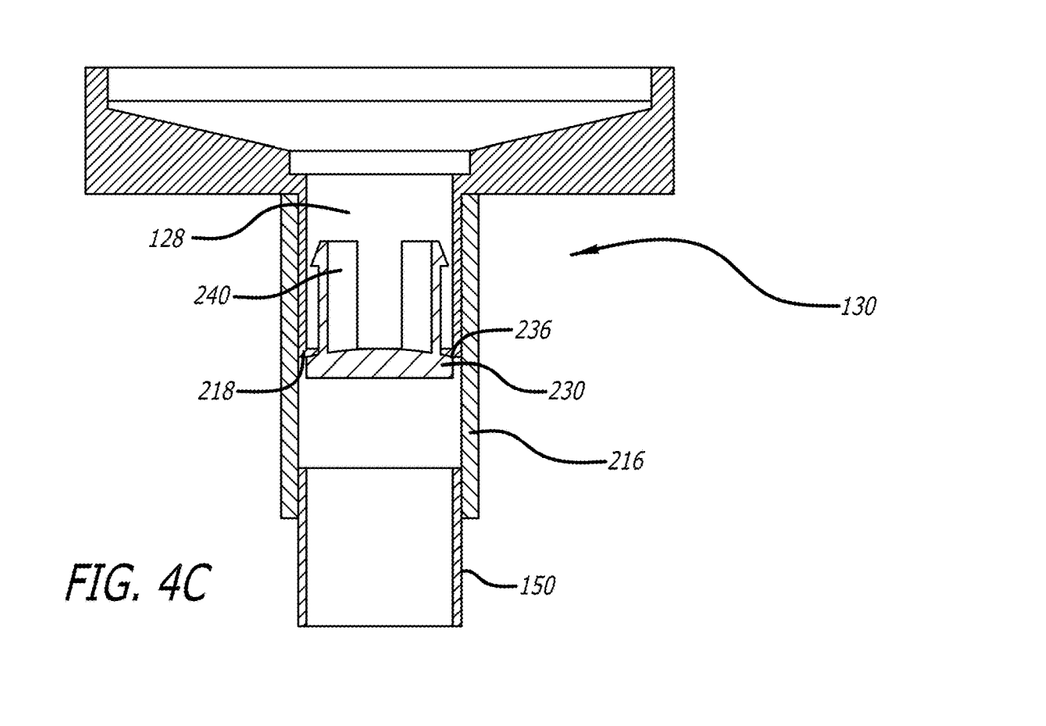

FIGS. 4A-4C illustrate components, features, and functionality of the plunger valve 130. FIG. 4A illustrates a detail perspective view of the plunger valve 130 and related components. FIG. 4B shows the plunger 230 in a "down" or open position, and FIG. 4C shows the plunger 230 in an "up" or closed position. A tubular coupling member 216 couples the drainage outlet 128 of the vacuum chamber 120 to the isolation chamber 150. The plunger valve 130 includes a displaceable plunger 230 having a circular base 231. A top side 232 of the base 231 includes a radially outward sloped surface 234 to prevent accumulation of the urine on the top side 232 as it drains from the vacuum chamber 120. In some embodiments, the plunger 230 can be composed of any elastomeric or viscoelastic material that is capable for a seal itself with the drainage outlet 128 under a pressure differential, such as a flexible PVC, natural latex rubber, EPDM, or silicone rubber, for example.

In the illustrated embodiment, four deflectable posts 240 are coupled with and extend away from the top side 232 and each post 240 includes a hook 241 at a free end. In other embodiments, the plunger 230 may include 2, 3, 5, or more posts 240. The drainage outlet 128 includes an inward protruding annular hook ledge 217 configured to engage the hooks 241 in a snap fit relationship. The engagement of the hooks 241 with the hook ledge 217 limits the downward displacement of the plunger 230 at the "down" position as shown in FIG. 4B. The spaces 242 between the posts 244 define a flow path for the urine as it drains from the vacuum chamber 120. A diameter of the base 231 is less than an inside diameter of the drainage outlet 128 to define an annular flow path 239 for the urine as it flows downward past the base 231 as illustrated in FIG. 4B.

The plunger 230 further includes an annular sealing ledge 236 disposed on the top side 232 and the drainage outlet 128 includes a corresponding annular sealing edge 218 at the bottom end of the drainage outlet 128. The annular sealing ledge 236 and the corresponding annular sealing edge 218 are configured to the define a seal between the plunger 230 and the drainage outlet 128 when the plunger 230 is disposed in the "up" position as show in FIG. 4C.

In use, with the plunger 230 in the "down" position, the urine drains from the vacuum chamber 120, through the drainage outlet 128, and flows perpendicularly onto the top side 232 of the plunger 230 where it flows radially outward along the sloped surface 234 and through the spaces 242 between the posts 240. The urine then flows downward through the annular flow path 239 and into the isolation chamber 150. In further use, when the vacuum source 142 is activated, vacuum within the vacuum chamber 120 draws the plunger 230 to the "up" position, so that the annular sealing ledge 236 engages the corresponding annular sealing edge 218 to seal off the drainage outlet 128, thereby preventing air and/or urine from flowing upward through the drainage outlet 128.

By way of summary, the vacuum within the vacuum chamber 120 causes the plunger 230 to displace to the "up" position to seal off the drainage outlet 128, so that a volume of urine may accumulate in the vacuum chamber 120. In response to the accumulated volume of urine in the vacuum chamber 128, the vacuum source 142 may be deactivated, relieving the vacuum within the vacuum chamber 120, which allows the plunger 230 to fall to the "down" position either due to its weight or due to hydrostatic pressure of the accumulated volume of urine applying a downward force thereto. The accumulated volume of urine in the vacuum chamber 120 may then drain from the vacuum chamber 120 into the isolation chamber 150 and further into the urine collection bag 160.

Figure 4D:
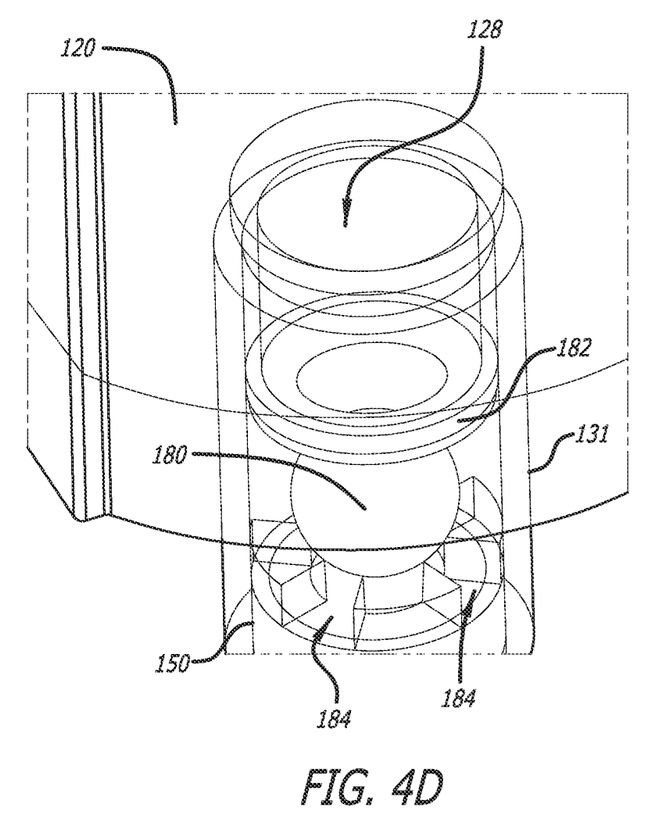
FIG. 4D illustrates a perspective view of another embodiment of the plunger valve, in accordance with some embodiments.

FIG. 4D illustrates another embodiment of a plunger valve that includes a check valve 131 having a ball 180 and a gasket 182. In the negative pressure environment, the ball 180 may be drawn upward towards the vacuum chamber 120 to define the closed configuration creating an airtight seal with the gasket 182. In the ambient pressure environment, the ball 180 may break the airtight seal with the gasket 182 by moving downward towards the isolation chamber 150 and allowing the volume of urine to pass through apertures 184 within the check valve 131 in the opened configuration.

Figure 5:
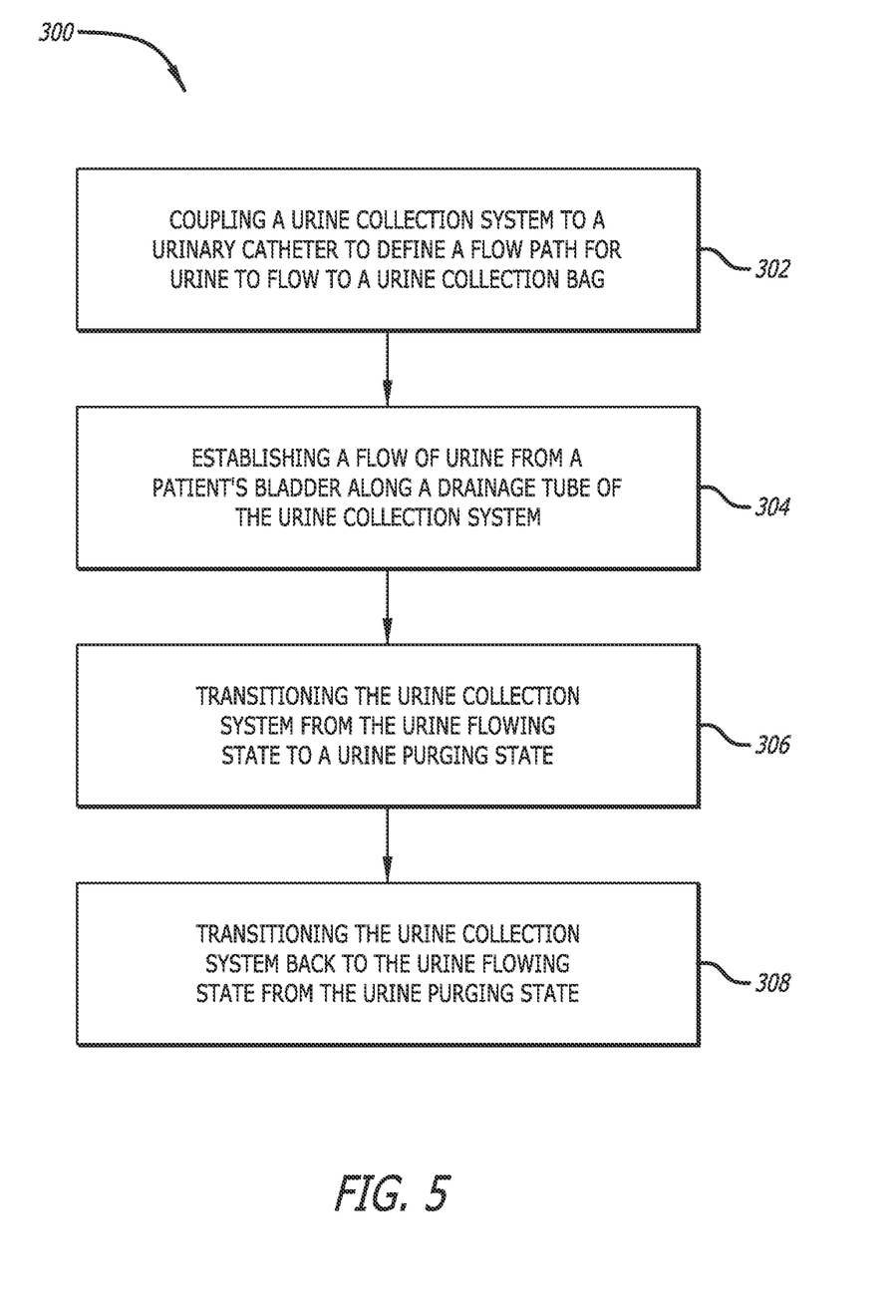
FIG. 5 illustrates a flow chart of an exemplary method of collecting urine in the urine collection bag, in accordance with some embodiments.

FIG. 5 illustrates a flow chart of an exemplary method 300 of collecting urine in the urine collection bag that, in accordance with some embodiments, may include all or a subset of the following steps or processes. The method 300 may include coupling the urine collection system to a urinary catheter to define a flow path for urine to flow from the urinary catheter to a urine collection bag of the urine collection system (block 302). The method may further include coupling the system to a bed or otherwise hanging the urine collection bag below the patient to allow gravity to induce a flow of urine.

The method 300 may further include establishing a flow of urine from a patient's bladder along a drainage tube of the urine collection system to the urine collection bag (block 304) with the system disposed in a urine flowing state.

The method 300 may further include transitioning the urine collection system from the urine flowing state to a urine purging state (block 306) to purge urine stagnantly disposed within the drainage tube toward the urine collection bag. In some instances, urine may collect (i.e., become stagnant) within depending on loop portions of the drainage tube thereby blocking the flow of urine therealong. Transitioning the system into the urine purging state may clear the blockage. In some embodiments of the method 300, transitioning the system from the urine flowing state to a urine purging state may include applying a vacuum to the vacuum chamber. In some embodiments of the method, applying the vacuum to the vacuum chamber causes a plunger valve disposed between the vacuum chamber and the urine collection bag to transition to a closed state to prevent fluid from flowing between the urine collection bag and the vacuum chamber. In some embodiments of the method 300, applying a vacuum includes (i) activating the vacuum pump coupled with the vacuum chamber according to a defined frequency, and (ii) maintaining operation of the vacuum pump for a defined duration for each activation.

The method 300 may further include transitioning the system back to the urine flowing state from the urine purging state (block 308) to re-establish the flow of urine from a patient's bladder along a drainage tube to the urine collection bag. In some embodiments of the method, transitioning the urine collection system from the urine purging state to the urine flowing state includes removing the vacuum from the vacuum chamber and allowing the plunger valve to self-transition from the closed state to the opened state to allow urine to drain from the vacuum chamber to the urine collection bag.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A urinary collection system, comprising:
a urine collection bag; and
a vacuum chamber coupled with the urine collection bag, the vacuum chamber comprising:
an exit port located at a bottom of the vacuum chamber, the exit port defining a first flow path for urine to flow from the vacuum chamber to the urine collection bag;
an inlet port located at a top of the vacuum chamber, the inlet port coupled with a drainage tube of the system, the drainage tube configured to couple with a urinary catheter to define a second flow path for urine to flow from a patient bladder to the vacuum chamber;
a vacuum port located at the top of the vacuum chamber, the vacuum port coupled with a vacuum tube of the system, the vacuum tube configured to couple with a vacuum source; and
a plunger valve disposed in line with the exit port, the plunger valve transitionable between an opened state and a closed state such that:
when transitioned to the opened state, urine is allowed to flow from the vacuum chamber to the urine collection bag, and
when transitioned to the closed state, fluid is prevented from flowing from the urine collection bag into the vacuum chamber,
wherein:
the plunger valve is configured to self-transition from the closed state to the opened state when a vacuum is removed from the vacuum chamber,
the opened state of the plunger valve is defined by a weight of a plunger of the plunger valve,
the exit port includes an annular protrusion extending radially inward from and circumferentially along an inside surface of the exit port, the annular protrusion including:
a top side annular ledge disposed adjacent the inside surface defining a displacement stop surface for the plunger in the opened state;
a bottom side annular ledge disposed adjacent the inside surface defining a sealing surface for the plunger valve in the closed state, and
an inside annular surface extending from the top side annular ledge to the bottom side annular ledge, the inside annular surface defining an unobstructed opening of the exit port for urine to flow through, and
the plunger includes a plurality of snap fit members protruding upward away from a base of the plunger through the unobstructed opening, the plurality of snap fit members configured to engage the top side annular ledge to limit downward displacement of the plunger.

2. The urinary collection system according to claim 1, further comprising the urinary catheter coupled with the drainage tube.

3. The urinary collection system according to claim 1, further comprising the vacuum source in the form of a vacuum pump, the vacuum pump transitionable between an activated state and a deactivated state.

4. The urinary collection system according to claim 1, further comprising an isolation chamber coupled between the exit port and the urine collection bag, the isolation chamber configured to inhibit reflux of the urine collected within the urine collection bag into the vacuum chamber.

5. The urinary collection system according to claim 4, wherein the isolation chamber includes an inclined bottom surface to inhibit reflux of the urine collected within the urine collection bag into the vacuum chamber.

6. The urinary collection system according to claim 4, wherein:
the urine collection bag includes an opening defining a third flow path for urine to flow from the isolation chamber into the urine collection bag, and
the opening includes a top perimeter that is disposed below an inlet port of the isolation chamber.

7. The urinary collection system according to claim 1, wherein the inlet port of the vacuum chamber includes an inlet port check valve in line with the inlet port of the vacuum chamber, the inlet port check valve configured to allow fluid to flow through the inlet port check valve into the vacuum chamber and prevent fluid from flowing out of the vacuum chamber through the inlet port check valve.

8. The urinary collection system according to claim 1, wherein the vacuum port includes a vacuum port valve in line with the vacuum port, the vacuum port valve configured to allow air to exit the vacuum chamber through the vacuum port valve and prevent urine from flowing out of the vacuum chamber through the vacuum port valve.

9. The urinary collection system according to claim 8, wherein the vacuum port valve is further configured to prevent air from flowing into the vacuum chamber through the vacuum port valve.

10. The urinary collection system according to claim 1, wherein the plunger valve is configured to transition from the opened state to the closed state when the vacuum is applied to the vacuum chamber.

11. The urinary collection system according to claim 10, wherein the plunger valve includes the plunger positionable between:
a lowered position when the plunger valve is disposed in the opened state, and
a raised position when the plunger valve is disposed in the closed state.

12. The urinary collection system according to claim 11, wherein the plunger is composed of flexible PVC, natural latex rubber, EPDM, or silicone rubber.

13. The urinary collection system according to claim 11, wherein the plunger defines a spherical shape.

14. The urinary collection system according to claim 11, wherein the plunger includes the plurality of snap fit members configured to engage the exit port to limit vertical displacement of the plunger.

15. A method of collecting a volume of urine within a urine collection bag, comprising:
coupling a urine collection system to a urinary catheter to define a flow path for urine to flow from the urinary catheter to the urine collection bag of the urine collection system,
establishing a passive flow of urine from a patient's bladder along a drainage tube of the urine collection system to the urine collection bag, the urine collection system disposed in a urine flowing state;
transitioning the urine collection system from the urine flowing state to a urine purging state to purge urine stagnantly disposed within the drainage tube toward the urine collection bag,
wherein:
transitioning to the urine purging state includes vertically displacing a free floating plunger of a plunger valve from a down position to an up position, the free floating plunger disposed within an exit port of a vacuum chamber disposed in line between the drainage tube and the urine collection bag, the exit port includes an annular protrusion extending radially inward from and circumferentially along an inside surface of the exit port, the annular protrusion including:
- a top side annular ledge disposed adjacent the inside surface defining a displacement stop surface for the free floating plunger in an opened state;
- a bottom side annular ledge disposed adjacent the inside surface defining a sealing surface for the plunger valve in a closed state, and
- an inside annular surface extending from the top side annular ledge to the bottom side annular ledge, the inside annular surface defining an unobstructed opening of the exit port for urine to flow through, in the up position, a circumferential edge of a disk portion of the free floating plunger forms a fluid seal with the bottom side annular ledge, and in the down position, a plurality of snap fit members protruding upward away from the disk portion and through the unobstructed opening engage the top side annular ledge to limit downward displacement of the free floating plunger; and transitioning the urine collection system back to the urine flowing state from the urine purging state to reestablish the flow of urine from the patient's bladder along the drainage tube to the urine collection bag, wherein the drainage tube is in continuous fluid communication with the vacuum chamber.

16. The method according to claim 15, wherein transitioning the urine collection system from the urine flowing state to the urine purging state comprises applying a vacuum to the vacuum chamber of the urine collection system, the vacuum exerting a force on the urine stagnantly disposed within the drainage tube to move the urine stagnantly disposed within the drainage tube toward the vacuum chamber.

17. The method according to claim 16, wherein applying the vacuum to the vacuum chamber causes the free floating plunger to vertically displace from the down position to the up position to transition the plunger valve to a closed state to prevent fluid from flowing between the urine collection bag and the vacuum chamber.

18. The method according to claim 16, wherein:
transitioning the urine collection system from the urine purging state to the urine flowing state comprises removing the vacuum from the vacuum chamber, and
removing the vacuum from the vacuum chamber allows the plunger valve to self-transition from the closed state to the opened state.

19. The method according to claim 16, wherein:
applying the vacuum includes applying the vacuum to the vacuum chamber via a vacuum port of the vacuum chamber,
the vacuum port including a filter disposed across the vacuum port, and
the filter defining a sterile barrier.

20. The method according to claim 19, wherein applying the vacuum includes:
activating a vacuum pump coupled with the vacuum chamber via the vacuum port according to a defined frequency, and
maintaining operation of the vacuum pump for a defined duration for each activation.

* * * * *